United States Patent Office 3,394,067
Patented July 23, 1968

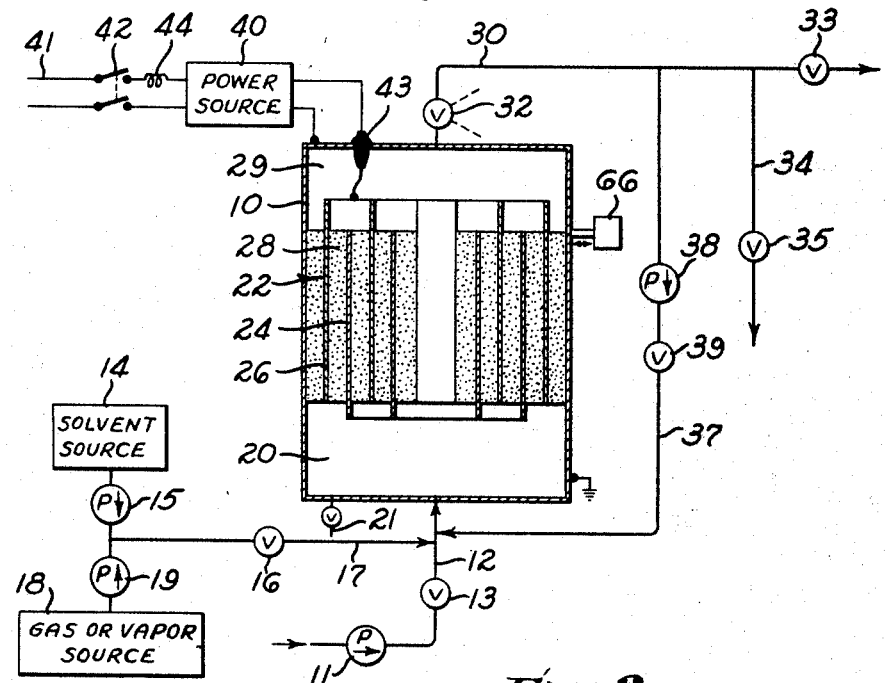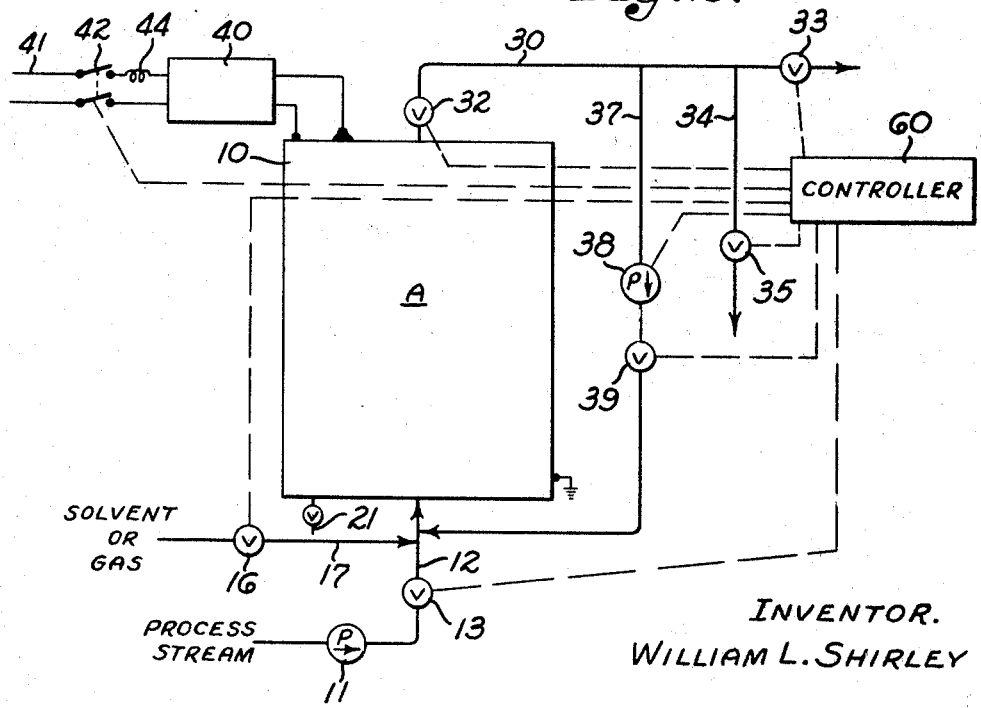

3,394,067
METHOD AND APPARATUS FOR
UNLOADING FILTERS
William L. Shirley, Houston, Tex., assignor to Petrolite Corporation, Wilmington, Del., a corporation of Delaware
Filed June 12, 1964, Ser. No. 374,751
13 Claims. (Cl. 204—180)

ABSTRACT OF THE DISCLOSURE

Porous filter masses of an electric or nonelectric filter are cleaned of deposits by use of a liquid-gas mixture that may be formed in one of several ways, including liberation of a gas in situ within the pores or ahead of the porous masses.

My invention relates to the cleaning or unloading of porous filter masses on which materials have been deposited by filtering action or by electrodeposition under the action of a high-voltage electric field.

It has been proposed to remove suspended materials from nonconducting liquids by passing them through a porous mass filling an interelectrode space in which a high-voltage unidirectional field is established. The field causes the finely suspended particles to deposit on the material in the porous mass. The patent to Hamlin No. 2,573,967 discloses such a process, applied to the removal of dirt particles from cleaning solvent, and suggests that the interelectrode space be filled with a loosely packed mass of fibrous material such as glass wool, rock wool, synthetic plastic fibers, etc. More recently electric filters have been proposed in which the interelectrode space is filled with polyurethane foam, forming one example of a non-particulate open-pore material having a fixed matrix with pores throughout its volume communicating with each other and arranged in a fixed pattern.

In such filters no satisfactory way has been found to remove the electrodeposited material from the interelectrode material. Removal of the electric field with a continued flow through the filter mass will remove only a small part of the deposit, as acknowledged in the patent supra. Backwashing is also largely ineffective as have been attempts to use solvents to dissolve the deposits. As acknowledged in the patent supra, complete cleaning requires removal and disintegration of the porous mass into its granular or filamentary components. Alternatively the process can remain effective only by replacing the filter mass with a fresh quantity of the material thereof. The problem of cleaning or unloading a filter mass in situ has remained unsolved. This is true whether the contaminants have been deposited mechanically or by electric action.

It is an object of the invention to provide a novel method and apparatus for cleaning or unloading a deposit-containing filter mass in situ and thus renewing its effectiveness for further filtering action. In this connection it is an object of the invention to remove deposits from the pores of a porous mass by creating a hydraulic disturbance or fluid turbulence therein sufficient to loosen the deposits, the loosened deposits being flushed from the porous mass by the same fluid that created the turbulence or by some other fluid. In the present disclosure the word "fluid" is used in a generic sense to indicate liquids, gases or vapors. The word "gases" or "gaseous material" is used to include either gases or vapors.

It is an object of the invention to unload or clean a deposit-containing porous mass by flowing a liquid-gas mixture through at least a part of the porous mass in loosening relationship with the deposits. Another object is to abruptly shift the flow through at least a portion of a porous mass from a stream of liquid to a stream of a liquid-gas mixture to effect loosening of deposits. As applied to a filter mass of polyurethane foam or a similar non-particulate open-pore material, the invention comprehends cleaning of deposits therefrom by use of a liquid-gas mixture used in such way as not to change or destroy the existing pore pattern.

Such a liquid-gas mixture can be formed in various ways. As compared with the liquid of the process stream being filtered its liquid phase may be composed of the same or a different liquid. Its gas phase may be a fixed gas or a vapor, the liquid-gas mixture being formed for example by injecting a fixed gas, steam or other vapors into a liquid stream. The stream is maintained under such conditions that the gas or vapors exist as a gaseous phase during flow through that portion of the porous mass in which the deposits are to be loosened.

Alternatively, the gaseous phase can be formed in the liquid by a rather sudden change in pressure or temperature to vaporize some of the liquid or some component thereof to form a liquid-gas mixture. A reduction in pressure induces a relatively violent and sudden boiling of the liquid. A very effective way of loosening deposited material from the porous mass is to fill the pores with a liquid under pressure, e.g. a volatile solvent or the liquid of the process stream if of sufficient volatility, and then reduce the pressure throughout the mass to a value below the vapor pressure of the liquid or some component thereof at the existing temperature. The reduction in pressure can be effected while the pores are filled with a static mass of the liquid or while the liquid is flowing through at least a portion of the porous mass. In the latter instance the reduction in pressure can be applied largely to the liquid within the pores or to the liquid stream close to but approaching the mass, or to both.

It is an object of the invention to provide a novel method and apparatus effecting loosening of the deposits in or on a porous mass by any of such practices. It is a further object to flush the loosened deposits from the filter mass at least in part by continued flow of the liquid-gas mixture therethrough, preferably in the same direction as such mixture was flowing when its gaseous phase was produced.

The invention is particularly effective in removing materials electrodeposited on a porous mass of the aforesaid non-particulate fixed-pore-pattern material such as open-pore polyurethane foam. The pore sizes may then be so large as to have little or no mechanical filtering action on the dispersed or contaminating particles of a liquid flowing therethrough. Likewise such a porous mass is characterized by a negligibly small pressure drop thereacross during flow of a liquid therethrough. The porous mass is positioned in an interelectrode space between spaced oppositely-poled electrodes electrically insulated from each other. All or a portion of the interelectrode space may be occupied by the porous mass but it is usually desirable that the mass bridge between electrically conducting surfaces of the electrodes. A high-voltage electric field is established between the electrodes by connecting them to a power source, the connections maintaining a high-voltage difference of potential between the electrodes. The porous mass is in this field and the lines of force of the field extend through the mass. Unidirectional electric fields are almost always used but alternating current fields or pulsating fields can be employed with some liquid systems. While the reason for the electrodeposition is not completely understood, it is believed that the elements of the mass act as voltage dividers and that short-length fields are established in the pores that induce movement of the dispersed particles to the material of the mass to electrodeposit thereon.

In an electric filter the liquid to be filtered or purified, i.e. the process stream, should be a relatively nonconductive liquid, i.e., a liquid of relatively high resistivity. Oils and organic liquids are examples. The dispersed contaminants that are to be removed may be of higher or lower resistivity than the continuous phase in which they are dispersed.

The invention is applicable to porous filter masses of various types. If the contaminants of the liquid are to be electrophoresed or electrodeposited each filter mass must be of relatively high resistivity so as not to short-circuit its bounding electrodes. The mass may be made up of loosely-packed particles or chunks of porous or nonporous granular material in random contact with each other, e.g. particles of sand, gravel, clay, carbon, etc. Sintered materials can sometimes be used. The porosity of such a mass of individual particles or such a sintered mass is not critical. Alternatively, the mass can be an open-pore filamentary structure. One example would be a structure formed of natural or synthetic fibers wound or woven to provide voids. Another example would be a filamentary foam formed of plastic material, e.g. filamentary polyurethane foam. Such a foam is best described as a three-dimensional network of filaments that are unitary at their junctions or points of tangency. The porosity of any such open-pore filamentary mass is not critical. However by way of example it is mentioned that filamentary polyurethane foams of a porosity of about 10–80 p.p.i. (pores per inch) give good results although foams with larger or smaller pores can be used. All such open-pore materials may be employed either as a single mass bridging the electrodes or as chunks or layers disposed in the interelectrode space to form the porous mass employed in the invention. Other open-pore filamentary structures can be used such as the loosely packed masses of glass wool, rock wool, synthetic plastic fibers, etc. disclosed in the patent supra.

Referring to the drawing:

FIG. 1 diagrammatically represents a typical electric filter with supply lines and with supplementary equipment aiding in the practice of the invention; and FIG. 2 represents a similar system equipped with a controller for controlling the sequence of the unloading steps of the invention.

Referring particularly to FIG. 1, the electric filter is housed in a closed container 10. The process liquid to be filtered, carrying the dispersed particles that are to be removed, is fed through the pump 11, inlet pipe 12 and valve 13 into the container. Solvent from a source 14 can be advanced by a pump 15 through a valve 16 in a supply pipe 17 communicating with the inlet pipe 12. Alternatively or in addition, a gas (or vapor) can be delivered from a gas source 18 to the supply pipe 17 and the inlet pipe 12, aided if desired by a pump 19.

The liquid from the inlet pipe 12 enters an entrance zone 20 of the container. Any contaminants of the process liquid settling therefrom by gravity in the entrance zone 20 may be removed therefrom from time to time through a valved pipe 21. The process liquid advances along the entrance zone 20 to the entrance end of an electrofilter 22. This includes a set of grounded electrodes 24 electrically connected to the container 10 if of metal, as will be exemplified, or to an outermost grounded electrode if the container is made of a nonmetallic material. The electrofilter 22 includes also a set of intervening or live electrodes 26 supported within the container and electrically insulated from the container and the electrodes 24 by any suitable means, not shown. The electrodes 24, 26 are equally spaced and may take any desired form, the container acting as an outermost electrode if desired. Concentric metal electrodes are exemplified in FIG. 1.

Each interelectrode space is shown as filled with a porous mass 28 of any of the types previously disclosed. The exemplified construction is such that the electrodes and the porous masses occupy the complete cross section of the container so that liquid from the inlet pipe 12 must flow through the masses to reach an exit chamber 29 of the container. Alternatively, and as earlier described, the porous masses 28 may occupy only a portion of the interelectrode space.

The filtrate or effluent liquid exists from the container through an effluent pipe 30 to storage or further processing steps, being throttled and controlled by a control valve 32 and if desired by a flow control valve 33. The control valve 32 will often be equipped with an adjustable stop means limiting its flow-control elements to move between a first or throttling position (in which its throttling action is at a higher level or value to develop a substantial back pressure and maintain a higher pressure in the container 10) and a second or open position (in which the throttling action is at a lower level or value to lower the back pressure applied to the container 10). These positions are suggested by the dotted lines of FIG. 1.

A pipe 34 and a valve 35 can conduct any solvent-continuous liquid or liquid-gas medium in the effluent pipe 30 to waste or to a solvent stripper for removal of solvent. A by-pass or recirculation pipe equipped with a circulating pump 38 and a valve 39 can be used to recirculate liquid from the effluent pipe 30 to the inlet pipe 12.

A high-voltage power source, shown as a power pack 40, is connected to an A.C. supply line 41 through a switch 42 and supplies a high-voltage potential, usually unidirectional, to its terminals. One of such terminals is connected to the container 10 and the other to the electrodes 26 through the usual inlet bushing 43. High-voltage fields are thus established in the interelectrode spaces occupied by the porous masses 28. A current-limiting or voltage-dropping impedance 44 is normally connected between the switch 42 and the power source.

In normal operation the liquid to be filtered is pumped through the inlet pipe 12 and divides between the porous masses 28 which exert some or no mechanical filtering action and, if the switch 42 is closed, an electric filtering action, all as previously described. During normal operation the control valve 32 is usually in its first or throttling position so as to maintain a substantial back pressure on the liquid in the container 10.

As a result of the filtering action, the pores of the porous masses tend to receive deposits of the dispersed particulate material carried by the process liquid. The effectiveness of the filtering action lessens with continued operation and the invention is primarily concerned wtih the cleaning or unloading of the porous filter medium after its filtering effectiveness is reduced to an uneconomic or commercially inacceptable value. Operation can often be continued until the deposits build up to 10% or more of the weight of the porous filter masses. The desirability of unloading can be determined by tests or observation of the filtrate or by a sensitive pressure transducer responsive to the pressure drop across the porous masses, which pressure drop will increase slightly as the deposits build up. In other instances the filter can be unloaded or cleaned in accordance with a predetermined time schedule.

The cleaning steps of the invention can be performed by various steps and in various sequences as will be described. Adjustments of the valves and flow conditions to be described can be effected manually by the valves of FIG. 1 or by use of a controller 60, FIG. 2, connected to the valves 13, 16, 32, 33, 35 and 39, also to the switch 42, all as indicated by the interconnecting dotted lines of FIG. 2 to control and actuate these elements in the desired sequence. The control of any valve fed by a pump may include also the control of such pump as suggested by the dotted line connecting the controller 60 to the recirculating pump 38. The controller 60 may be a timer controlling both the time of the filtration and the later unloading operation with each operating step in the latter being performed in accordance with a predetermined time sequence. Alternatively the controller 60 may be of the type controlling such operating steps in a definite time sequence but with the start of its operation being determined by some control element in the system. Such control element may be a pressure transducer responsive to the pressure drop across the filter elements, a device in the effluent pipe 30 responsive to the clarity of the filtrate or degree of effectiveness of the filtering action, etc.

If a liquid of relatively low volatility, such as a lubricating oil or a jet fuel, is being filtered by the foregoing steps, an effective sequence for loosening and removing the deposits is as follows. After de-energizing the electrodes by opening the switch 42, an inert gas such as nitrogen, air or carbon dioxide may be bubbled through the liquid within the container 10 or may be mixed with the influent process stream by opening the valves 16, 19 and 35. If the liquid is being filtered at elevated temperature and pressure sufficient to prevent condensation of steam, the liquid-gas mixture may be formed by adding steam to the influent process stream from the source 18 through the valve 16. Aside from this, neither the back pressure nor the temperature within the container 10 is a critical factor as concerns the loosening and removal of the deposits by a liquid-gas mixture. If steam is employed the mass should be thoroughly dried after unloading, as by passing a hot gas or drying liquid therethrough.

The volume of gas (fixed gas or vapors) introduced is not critical but best results will be obtained if the volume of gas is such as to form a liquid-gas mixture composed largely of a continuous phase of liquid with gas particles dispersed therein, although some or even all of the mixture may be of the gas-continuous type with particles of the liquid carried by the gas. The liquid-gas mixture enters the porous masses and creates a hydraulic disturbance which loosens the deposits, probably by hydraulic turbulence. Continued flow of the liquid-gas mixture will remove the loosened deposits from the filter mass or these can be removed by flowing a stream of the process liquid or some other liquid through the filter mass. The loosening action is quite different from and unexpectedly more effective than any action effected merely by increasing the rate of flow of the process liquid, possibly because of the shearing action of the particles of the liquid or gas in the liquid-gas mixture, the sudden change in the media contacting an increment of the deposit (i.e. from liquid to gas to liquid etc.), or a tendency for the gas to penetrate or come between the deposit and the material of the porous mass. Better loosening and removal can often be accomplished if the control valve 32 is opened slightly or moved to its second open or less-throttling position during loosening and flushing of the deposits by the liquid gas mixture, thus reducing somewhat the back pressure otherwise imposed on the container 10.

Whether the liquid being filtered is of relatively low or relatively high volatility, a very effective and thorough unloading of the deposit-containing porous mass can be effected by the following steps. Valve 13 is closed and the pump 15 and valve 16 are actuated to supply to the filter unit from the source 14 a stream of a liquid of high volatility, e.g. a solvent. The switch 42 may remain closed at this time and the valve 32 may be in its first or more restricted throttling position. The solvent may be hotter than the liquid of the process stream giving rise to the deposits. The resulting stream of solvent will remove little or none of the deposits, functioning primarily as a displacement stream to displace the process liquid from the pores of the filter mass and the container 10. The effluent from the container 10 may be removed from the system through the valve 35 to waste or to a solvent recovery system.

When the solvent has largely displaced the process liquid the switch 42 is opened and the valve 32 shifted from its first to its second less-throttling position, the solvent stream continuing. This suddenly reduces the back pressure in the container and the pressure on the solvent in the pores of the filter mass to a value below the vapor pressure of the solvent at the then existing temperature. The result is that a portion of the solvent flashes into vapor within the pores of the filter mass, creating a hydraulic disturbance, a fluid turbulence and a scrubbing action that loosens the deposits by an action even more efficient than obtained from the liquid-gas mixtures previously described. The vaporization of a portion of the solvent in or just ahead of the filter mass appears particularly effective, such vaporization forming a liquid-gas mixture in which the gas is a vapor of the solvent stream or a component thereof. The continued inflow of the solvent causes the liquid-gas mixture or the solvent itself to act as a flush stream flushing the deposits from the porous filter and removing them from the container 10.

The amount of the solvent vaporized in such an operation is only such as to form a liquid-gas mixture. This amount will depend upon the temperature of the solvent stream and the degree of pressure reduction created by operation of the valve 32. Vaporization stops and equilibrium is reached when the solvent is at a pressure equal to its vapor pressure at the new temperature and pressure within the container 10.

It is also possible to stop or restrict the flow of the displacing solvent by closing the valve 16, allowing the pressure in the container 10 to lower by escape of the solvent through the valve 32 at its original setting or by opening this valve to its second throttle position. This volatilizes a portion of the solvent body in the pores of the filter mass and produces a liquid-gas mixture having the deposit-loosening effects noted above. The solvent flow can then be restarted or continued at its lower rate to flush the loosened deposits from the container.

If the contaminated process liquid is a volatile solvent carrying some contaminant in suspension, or any stream some component of which can be volatilized by the aforesaid reduction in pressure, there is sometimes no need to shift to any separate solvent to displace the process liquid and produce the liquid-gas mixture used for loosening and flashing away the deposits. In this instance it is necessary only to shift the valve 32 to its second or less throttling position at the start of the unloading cycle. The reduction in pressure in the container 10 should be such as to volatilize a portion of the process liquid and form a liquid-gas mixture. The reduction in pressure on the container 10 will be effective to volatilize such portion of the process liquid both in the pores of the filter mass and in the entrance chamber 20. As before, the filter effluent may be discharged through the valve 35.

Mechanical agitation can be used to aid the loosening effected by any of the foregoing liquid-gas mixtures but is not essential. For example a vibrator 66, connected to the container 10 or directly to the electrodes 24, can be employed to induce a mechanical agitation aiding the loosening or removal of the deposits from the porous material of the filter.

An example of the unloading process of the invention used in the electric filtration of solids from cyclohexane and the loosening and removal of the deposits collected in the filter mass is as follows. Filtration of such a cyclohexane stream to remove solids therefrom can be effected between electrodes spaced one-inch apart and energized to develop a potential difference of about 44 kv. therebetween, the interelectrode spaces being filled with 20 p.p.i. polyurethane foam. Such filtration may be at a temperature of 290° F. with a black pressure of about 123 p.s.i. within the container 10 developed by the control valve 32 when in its first or more restricted position. When the porous foam has become loaded to such extent as to become inefficient in its filtering ability the valve 13 is closed and the valve 16 opened to supply a flush solvent such as cyclohexane or propane to displace the polymer solution from the filter mass. The flow of the flush solvent can continue for several minutes. The temperature of the solvent may be the same or higher than the operating temperature, e.g. about 320° F. but should desirably be below the boiling point of the flush solvent at the existing pressure. The valve 32 is then shifted to its second or less throttling position, decreasing the pressure in the container to about 60–80 p.s.i., and resulting in the production of the deposit-loosening liquid-gas mixture. The solvent flow may continue, usually at a reduced rate, to displace the loosened deposits. The solvent stream containing these deposits may be discharged through the line 34 by opening the valve 35. It is not uncommon to find that about 20–40% by weight of the deposits can thus be removed with a flush flow of solvent continuing about as long as the displacement flow used for displacing the process cyclohexane. The times of the displacement flow and the flush flow of the liquid-gas mixture are not critical. The longer each is continued the more of the deposit is removed, up to a period of an hour or more. Periods respectively of about 10–30 minutes for the displacement flow and 10–20 minutes for the flush flow will usually be sufficient to effect complete cleaning even of large filter units.

After such a solvent displacement flow, pressure reduction and continued flow of the liquid-gas mixture as a flush, it is desirable to re-establish normal operating pressures and temperatures, close the switch 42 and flow the solvent through the filter mass until all residual loose material has been refixed or deposited on the porous filter material. Recirculation of the solvent is desirable, but not necessary, at this time, as by starting the recirculating pump 38 and opening the ricirculation valve 39 with valves 13 and 16 closed. Such recirculation through the energized filter can also be used to redeposit residual material loosened but not completely removed from the container 10 by flow of a liquid-gas stream in which the gas is a fixed gas or a vapor such as steam. The recirculated liquid would then be the process liquid, with concurrent deposition of its impurities and the residual deposits not completely removed. Any of such recirculations is discontinued after the residual deposits become fixed to the filter mass. The flow of the process liquid may then be-restablished to start the next filter cycle.

Various changes and modifications can be made without departing from the spirit of the invention as defined in the appended claims.

I claim:
1. A process for recovering dispersed material from a process stream of a liquid in which such material is dispersed as small particles, which process includes the steps of:
   flowing such a process stream under pressure through an interelectrode space containing a porous mass;
   established an intense electric field in the interelectrode space containing the porous mass to electrodeposit said dispersed material on said mass in the pores thereof;
   removing the electrodepositing potential from the electrodes;
   loosening the electrodeposited material from the pores of said porous mass by reducing the pressure throughout said porous mass while said pores contain a volatile liquid to a value below the vapor pressure of said volatile liquid, thereby inducing boiling thereof and liberation of vapors therefrom and formation of a liquid-vapor mixture; and
   continuing the flow of said liquid-vapor mixture through said mass to remove said loosened material therefrom.

2. A process for removing deposited materials from a deposit-containing porous mass, which process includes the steps of:
   loosening such deposits from said deposit-containing porous mass by subjecting such mass to relatively intense agitation induced by flowing a liquid-gas mixture through at least a portion of such mass, such loosening being effected by at least partially filling the pores of the deposit-containing porous mass with a volatile liquid and reducing the pressure throughout said porous mass to a value below the vapor pressure of said volatile liquid to induce boiling thereof and liberation of vapors therefrom to form said liquid-gas mixture; and
   removing the loosened deposits from said mass by fluid flow therethrough.

3. A process for removing material electrodeposited from a dispersion onto an interelectrode porous mass by a high-voltage potential applied to the electrodes, which process includes the steps of:
   removing the high-voltage potential applied to the electrodes;
   loosening said electrodeposited material from said deposit-containing porous mass by subjecting such material to relatively intense fluid turbulence induced by flowing a liquid-gas mixture through at least a portion of such mass, such loosening being effected by at least partially filling the pores of said deposit-containing porous mass with a solvent and then reducing the pressure throughout such mass to a value below the vapor pressure of said solvent to induce boiling of said solvent and liberation of solvent vapors to form said liquid-gas mixture; and
   removing the loosened deposits from said mass by fluid flow therethrough.

4. A process for removing material electrodeposited from a dispersion onto an interelectrode porous mass by a high-voltage potential applied to the electrodes, which process includes the steps of:
   removing the high-voltage potential applied to the electrodes;
   loosening said electrodeposited material from said deposit-containing porous mass by subjecting such material to relatively intense fluid turbulence induced by flowing a liquid-gas mixture through at least a portion of such mass, said liquid-gas mixture being formed by flowing a volatile liquid toward said deposit-containing porous mass and then reducing the pressure on said liquid to a value below the vapor pressure thereof to liberate vapors therefrom and form said liquid-gas mixture, said liquid-gas mixture being advanced to and through said deposit-containing porous mass to loosen such deposits.

5. A process as defined in claim 1 in which said loosening of the electrodeposited material is effected by stopping the flow of said process stream, then largely displacing the liquid of the process stream from the pores of said porous mass by flowing said volatile liquid into said porous mass, and then performing the step of reducing the pressure throughout the porous mass to induce boiling of such volatile liquid and liberation of said vapors therefrom, the step of removing the potential from the electrodes being performed at a time earlier than said pressure-reducing step.

6. A process as defined in claim 5 in which the volatile liquid is flowed into said porous mass under pressure, and including the step of stopping the flow of said volatile liquid to form a body of said volatile liquid under pressure with portions thereof disposed in said pores, and then reducing the pressure on said body of volatile liquid to induce liberation of vapors in said pores.

7. A process as defined in claim 5 in which the volatile liquid is flowed into and through said porous mass with a back pressure maintained on the volatile liquid exiting from said porous mass; and in which the pressure throughout the porous mass is then suddenly reduced by suddenly reducing said back pressure during continued flow of said volatile liquid through the porous mass, such continued flow comprising the continued flow of said liquid-vapor mixture removing said loosened material from said porous mass.

8. A process for removing deposited materials from a deposit-containing porous mass, which process includes the steps of:
  flowing toward and into said porous mass containing said deposited materials a stream of liquid having a vaporizable component;
  vaporizing a portion of said vaporizable component at a time no later than when said liquid fills a substantial portion of the pores of said porous mass thus creating a liquid-vapor mixture effective to remove a substantial portion of said deposited materials; and
  removing the loosened deposits from said mass by fluid flow therethrough.

9. A process for removing electrodeposited material from a non-particulate open-pore deposit-containing porous material contained in a vessel between electrodes therein, said porous material comprising a fixed matrix with pores throughout its volume communicating with each other and arranged in a fixed pattern, which process includes the steps of:
  producing a liquid-gas mixture at a position upstream of said vessel;
  loosening such deposits from said open-pore deposit-containing porous material while in said vessel and without changing the pore pattern thereof by subjecting the deposits on such material to relatively intense agitation induced by flowing said liquid-gas mixture through the communicating pores of such material; and
  removing the loosened deposits from said material by fluid flow therethrough.

10. A process as defined in claim 9 in which said liquid-gas mixture is formed by injecting an inert gas into a liquid at a position removed from said vessel to produce said liquid-gas mixture, delivering such liquid-gas mixture to one end of said vessel, and flowing said liquid-gas mixture through said porous material to and from another end of said vessel to loosen said deposits.

11. Electrofiltering apparatus for filtering a process liquid containing electrodepositable materials, said apparatus including in combination:
  a container having influent and effluent pipes communicating with respective entrance and exit ends thereof;
  spaced oppositely-poled electrodes in said container providing interelectrode spaces between said entrance and exit ends in the path of flow of liquid supplied through said influent pipe and exiting from said effluent pipe;
  porous masses at least partially filling said interelectrode spaces;
  means for supplying a stream of said process liquid to said influent pipe;
  means for energizing said electrodes to electrodeposit said materials in the pores of said porous masses;
  means for displacing said process liquid from said porous masses and for filling the pores thereof with a volatile liquid under pressure; and
  means for reducing the pressure in said container to a value below the vapor pressure of said liquid, said last-named means including a control valve in said effluent pipe having stop means controlling the movement of said valve between a first throttling position in which the pressure in said container is higher than the vapor pressure of said volatile liquid and a second position in which the pressure in said container is below the vapor pressure of said volatile liquid, said control valve being shiftable from its first to its second position while said volatile liquid fills said pores to produce a liquid-gas mixture in said container exiting from said pores and from said container through said valve.

12. Electrofiltering apparatus as defined in claim 11 including a controller incorporating said means for energizing said electrodes and including means for de-energizing said electrodes when said materials have electrodeposited in the pores of said porous masses, said controller being operatively connected to said control valve, to said means for supplying said stream of process liquid and to said means for displacing said process liquid to control same in a sequence including displacing said process liquid and filling the pores of said porous masses with said volatile liquid under pressure and then shifting said valve from its first position to its second position while the electrodes are de-energized.

13. Electrofiltering apparatus for filtering a process liquid containing electrodepositable materials, said apparatus including in combination:
  a container having influent and effluent pipes communicating with respective entrance and exit ends thereof;
  spaced oppositely-poled electrodes in said container providing interelectrode spaces between said entrance and exit ends in the path of flow of liquid supplied through said influent pipe and exiting from said effluent pipe;
  porous masses at least partially filling said interelectrode spaces;
  means for supplying a stream of said process liquid to said influent pipe;
  means for energizing said electrodes to electrodeposit said materials in the pores of said porous masses, said last-named means including means for de-energizing said electrodes;
  means for forming a liquid-gas mixture, said last-named means including a gas pipe connected to said influent pipe and means for delivering gas under pressure through said gas pipe to said influent pipe to inject such gas into the liquid therein to form a liquid-gas mixture delivered by said influent pipe to the interior of said container to flow through the pores of said porous mass and exit through said effluent means; and
  means for controlling the injection of said gas to occur only during periods of de-energization of said electrodes.

References Cited

UNITED STATES PATENTS

| | | | |
|---|---|---|---|
| 553,641 | 1/1896 | Deutsch | 210—274 X |
| 593,666 | 11/1897 | Jewell et al. | 210—274 |
| 2,573,967 | 11/1951 | Hamlin | 204—188 |

FOREIGN PATENTS

| | | |
|---|---|---|
| 956,311 | 4/1964 | Great Britain. |

JOHN H. MACK, *Primary Examiner.*

A. C. PRESCOTT, *Assistant Examiner.*